(12) United States Patent
Chen et al.

(10) Patent No.: US 11,150,349 B2
(45) Date of Patent: Oct. 19, 2021

(54) MULTI-LINE, HIGH-DEFINITION LIDAR DEVICE AND METHOD WITH INTEGRATED DIRECT SPATIAL REFERENCE

(71) Applicants: Wei Chen, Ellicott City, MD (US); Shan Zhong, Clarksville, MD (US); Jin Zhang, Ellicott City, MD (US); Zhonghua Zhu, Clarksville, MD (US); Lei Wu, Pleasanton, CA (US)

(72) Inventors: Wei Chen, Ellicott City, MD (US); Shan Zhong, Clarksville, MD (US); Jin Zhang, Ellicott City, MD (US); Zhonghua Zhu, Clarksville, MD (US); Lei Wu, Pleasanton, CA (US)

( * ) Notice: Subject to any disclaimer, the term of this patent is extended or adjusted under 35 U.S.C. 154(b) by 0 days.

(21) Appl. No.: 16/104,129

(22) Filed: Aug. 16, 2018

(65) Prior Publication Data
US 2020/0249351 A1    Aug. 6, 2020

(51) Int. Cl.
| G01S 17/00 | (2020.01) |
| G01S 17/36 | (2006.01) |
| G01S 17/58 | (2006.01) |
| G01S 7/4911 | (2020.01) |
| G01S 7/4912 | (2020.01) |

(52) U.S. Cl.
CPC .......... *G01S 17/36* (2013.01); *G01S 7/4911* (2013.01); *G01S 7/4917* (2013.01); *G01S 17/58* (2013.01)

(58) Field of Classification Search
CPC ...... G01S 7/4911; G01S 7/4917; G01S 17/36; G01S 17/58; G01S 7/484; G01S 7/486; G01S 7/493; G01S 7/4804; G01S 7/4808; G01S 7/4915; G01S 17/00; G01S 17/42; G01S 13/10; G01S 13/26; G01S 13/32; G01S 13/84; G01S 13/524; G01S 13/534; G01S 13/583; G01S 13/5248; G01S 15/104; G01S 7/35; G01S 13/0209; G01S 17/46; G01S 17/48; H04L 27/205; A61B 6/03; G01N 21/17; G01N 2021/1787
USPC ........................................................ 356/5.1
See application file for complete search history.

(56) References Cited

U.S. PATENT DOCUMENTS

| 4,716,414 A * | 12/1987 | Luttrell ............. G01S 13/89 342/179 |
| 6,040,898 A * | 3/2000 | Mrosik ............. G01S 17/36 356/5.09 |
| 2011/0292371 A1* | 12/2011 | Chang ............. G01S 17/10 356/5.01 |
| 2014/0376001 A1* | 12/2014 | Swanson ............. A61B 5/0066 356/479 |
| 2016/0025843 A1* | 1/2016 | Sebastian ............. G01S 7/4814 356/4.01 |

* cited by examiner

*Primary Examiner* — James R Hulka (57) ABSTRACT

The present disclosure relates to a FMCW Light Detection and Ranging system, a wave train of carrier frequency is modulated in narrow-band sequence, an delay interferometer with in-phase and quadrature outputs extracts the phase of this frequency modulation, and a coherent receiver with in-phase and quadrature outputs detects the phase of reflected light from a remote object, the ratio between two phases determines the distance of the remote object.

15 Claims, 6 Drawing Sheets

MULTI-LINE, HIGH-DEFINITION LIDAR DEVICE AND METHOD WITH INTEGRATED DIRECT SPATIAL REFERENCE

This patent document claims benefit under 35 U.S.C. § 119 to U.S. Provisional Patent Application Ser. No. 62/546,572, entitled "Multi-line, High-definition LiDAR Device and Method with Integrated Direct Spatial Reference" and filed on Aug. 17, 2017, which is fully incorporated herein by reference.

TECHNICAL FIELD

The present disclosure relates to Light Detection and Ranging (LiDAR) technology, and more particularly, relates to Frequency Modulated Continuous Wave (FMCW) LiDAR system and light detection and ranging method.

BACKGROUND

A number of object detection sensors are employed in applications such as collision avoidance, automatic driving and active safety. Among these sensors, LiDAR sensors have some advantages such as precise distance measurement, high angular resolution, low latency and relatively low system complexity.

LiDAR sensors can determine the distance to an object situated freely in space by emitting and receiving intensity or frequency-modulated optical waves. One of these waves is Frequency Modulated Continuous Wave (FMCW). The commonly used modulation format in laser frequency is a linear chirp. By measuring the frequency difference between transmitted light and received light through either direct detection or coherent detection, the round trip time can be calculated.

SUMMARY OF THE INVENTION

Some embodiments of the present disclosure relates to FMCW LiDAR system and light detection and ranging method.

According to one aspect of the present disclosure, a Light Detection and Ranging (LiDAR) system may include a light source configured to emit light with a frequency modulated in narrow-band time sequence; an optical transmitter waveguide configured to guide the emitted light toward a remote object; an optical receiver waveguide configured to receive reflection light from the remote object; a reference delay interferometer configured to interfere reference light with a delay of the reference light and produce a first in-phase output and a first quadrature output; a coherent receiver configured to mix the emitted light with the reflection light and produce an second in-phase output and a second quadrature output; and a processor configured to calculate a first phase variance related to the modulated frequency based on the first in-phase output, the first quadrature output, and a second phase variance related to the modulated frequency based on second in-phase output and the second quadrature output, wherein the reference light is derived from the emitted light.

Additional features and advantages of the present disclosure will become more readily apparent from the following description, along with the accompany drawings.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, module or assembly of different level in ascending order. However, the terms may be displaced by other expression if they may achieve the same purpose.

It will be understood that when a unit, engine, module or block is referred to as being "on," "connected to" or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The present disclosure provided herein relates to Frequency Modulated Continuous Wave (FMCW) LiDAR system and light detection and ranging method. Narrow-band FMCW such as sinusoidal FMCW may be used for the laser. A coherent receiver with in-phase (I) and quadrature (Q) outputs can calculate the resulting phase from the frequency modulation. Meanwhile, an on-chip delay interferometer, as an internal-scale, may provide baseline phase measurement from the frequency modulation. The ratio between the measured phase variance from the coherent receiver, and the measured phase variance from the internal scale, is equivalent to the ratio between the round trip distance to the remote object and the optical delay of the internal scale. It is understood that it is for illustration purposes, and not intended to limit the scope of the present disclosure. The system and method disclosed herein may be used for distance and/or velocity measurement in, for example, vehicles, robots or drones, etc.

Figure 1:
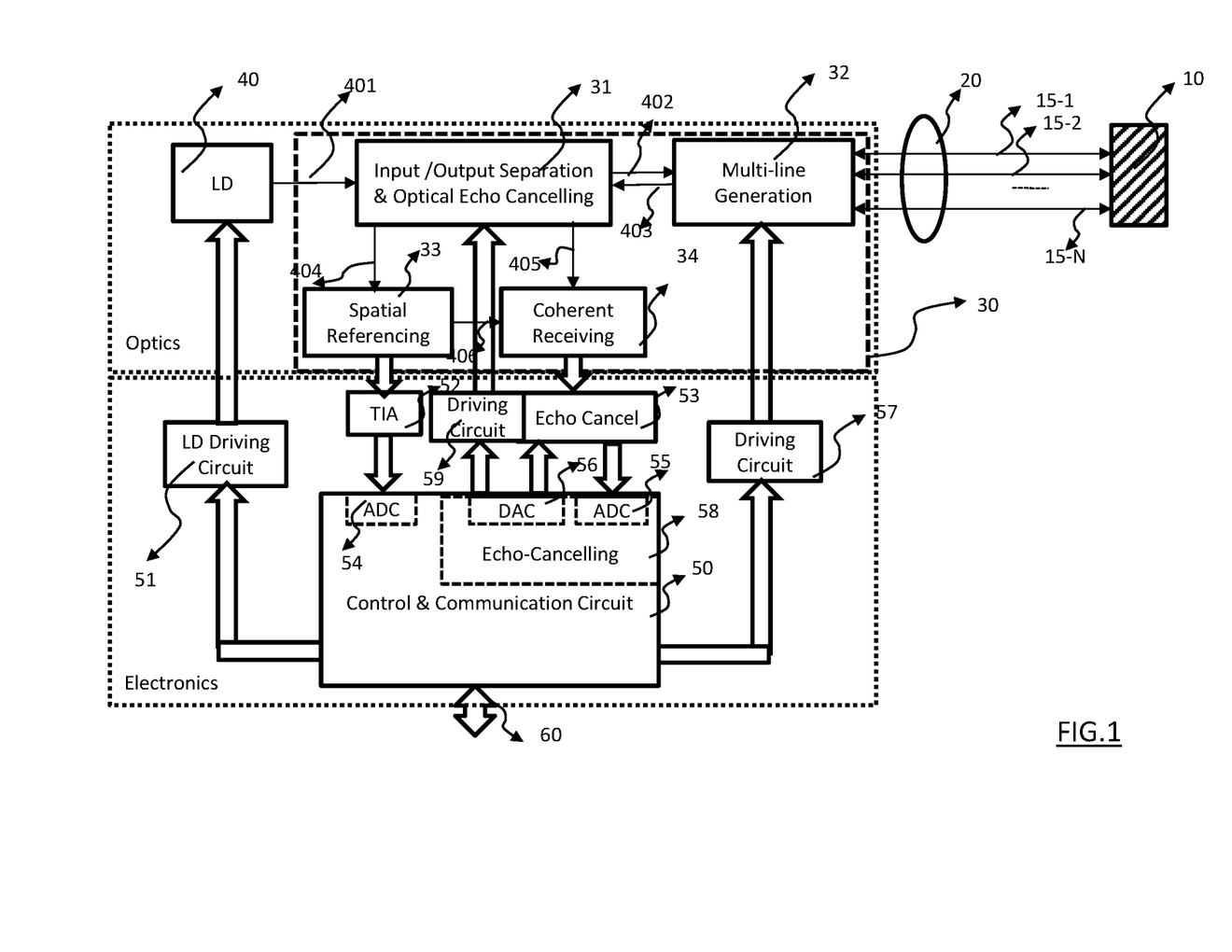
FIG. 1 is a block diagram of a LiDAR system according to some embodiments of the present disclosure.

Referring to FIG. 1, a LiDAR system according to some embodiments of the present disclosure consists of both optic and electronic modules. The optics module includes a laser diode (LD) 40, a photonics integrated circuit (PIC) 30 and lens system 20. In some embodiments, the PIC 30 can be an integrated circuit chip. The PIC 30 may include an optical transmitter/receiver waveguide, such as an input/output separation & optical echo cancelling circuit 31, a multi-line generation circuit 32, a reference delay interferometer, such as a spatial reference circuit 33 and a coherent receiving circuit 34. The input/output separation & optical echo cancelling circuit 31 may be configured to receive a first laser 401 from the LD 40 and send a second laser 402 to the multi-line generation circuit 32. In some embodiments, the input/output separation & optical echo cancelling circuit 31 may be duplex, light can be transmitted from and received through circuit 31. The configuration can share the same optical lenses to transmit and receive the light to/from the remote objects. It saves overall system cost and makes the mechanical design more flexible. The multi-line generation circuit 32 may be configured to switched the second laser 402 into N(N=2, 3, 4, . . . ) outputs and transmit them to N ports of the PIC 30. Through the optical lens 20, these N outputs may be converted into N LiDAR laser sensing beams, 15-1, 15-2, . . . , 15-N, which may be further transmitted to the remote object 10. Diffused reflection lights that follow the same laser sensing beam path 15-1, 15-2, . . . 15-N, may be collected by the optical lens 20 and coupled back into the multi-line generation circuit 32 on the PIC 30, forming a third laser light 403 back into the input/output separation & optical echo cancelling circuit 31. This circuit 31 may be further configured to process these laser lights 401, 402 and 403, produce and send a fourth laser light (the reference light) 404 to the spatial referencing circuit 33; a portion of the fourth laser light 404, i.e. a sixth laser light 406 may be sent to coherent receiving circuit 34 from the spatial referencing circuit 33. The circuit 31 may also be configured to produce and send a signal light, i.e. a fifth laser light 405 to coherent receiving circuit 34. The spatial reference circuit 33 may be configured to interfere reference light with a delay of the reference light and produce a first in-phase output and a first quadrature output. The coherent receiving circuit 34 may be configured to mix the sixth laser light 406 representing emitted light with the fifth laser light 405 representing the reflection light and produce an second in-phase output and a second quadrature output.

The LiDAR system may also have an electronic module that may operate with the optic module. This electronic module may include an MCU 50, an LD driving circuit 51, a trans-impedance amplifier(TIA) 52, an echo cancelling circuit 53, a multi-line generation driving circuit 57, and a driving circuit 59. The first echo cancelling circuit 53 may include discrete elements in an example. The MCU 50 may include a first ADC(Analog Digital Converter) 54, a second ADC 55, a DAC(Digital Analog Converter), an echo-cancelling digital processor 58 and a control & communication circuit. The electrical signals generated by the optical spatial reference circuit 33 can be collected and analyzed through a chain of functional circuits including the TIA 52, the first ADC 54 and a processing in MCU 50. In comparison, the signals generated by the optical coherent receiving circuit 34 may also be collected and analyzed through a chain of functional circuits including the echo-cancelling circuit 53, the second ADC 55, the DAC 56, the driving circuit 59 for optical echo cancelling as well as an echo-cancelling digital processor 58. In the MCU 50, a process is implemented to calculate a first phase variance related to the modulated frequency based on the signals of the optical spatial reference circuit 33 and a second phase variance related to the modulated frequency based on the signals of the optical coherent receiving circuit 34. The MCU 50 is further configured to derive a ratio between the first phase variance and the second phase variance and calculate the absolute distance of the remote object 10.

Figure 2:
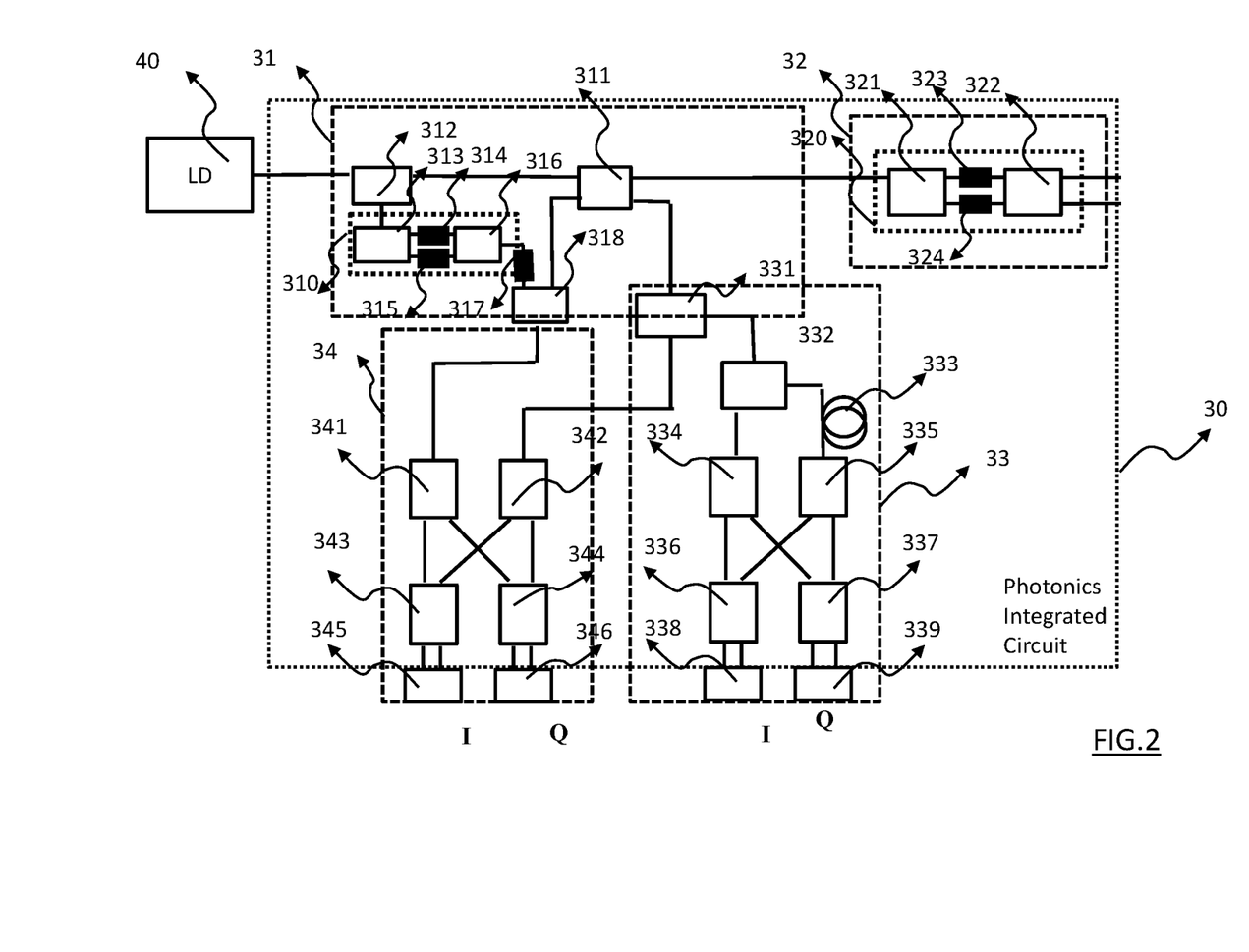
FIG. 2 is a schematic diagram of a photonic integrated circuitry according to some embodiments of the present disclosure.

More details of PIC 30 can be found in FIG. 2. The input/output separation & optical echo cancelling unit 31 may include five 1×2 splitter/combiners 312, 313, 316, 317, 318 and a 2×2 coupler 311. It can be understood that the numbers of the splitter/combiners can be varied depending on specific application. Phase shifters 314, 315 which arranged between the splitter/combiners 313 and 316, may be used for variable optical attenuator during the optical echo cancelling process. Phase shifter 317 which arranged between the splitter/combiners 316 and 318, may be used for pure phase adjustor during the optical echo cancelling process. A calculated attenuation can be applied to the variable optical attenuator, and a phase value can be applied to the phase adjustor so as to match the unintended reflection applied to the coherent receiver 34. The spatial reference unit 33 may have one 10:90 1×2 splitter 331 at the frond-end, sending a big proportion, for example 90% of reference light as the sixth laser light 406 to the coherent detection unit 34. It can be understood that the proportion of reference light can be varied depending on specific application. Followed by 1×2 splitter 332, a small proportion, for example the rest 10% of reference light may be split into two paths, one path having extra 5 cm~15 cm delay line 333 than the other. Both paths of light then enter a standard I/Q coherent detection circuit that may include two 1×2 splitters 334, 335 and two 2×2 couplers 336, 337 followed by two balance detectors 338, 339. The coherent receiving unit 34 may also have a standard I/Q coherent detection circuit that includes two 1×2 splitters 341, 342 and two 2×2 couplers 343, 344 followed by two balance detectors 345, 346. The standard I/Q coherent detection circuit may have two inputs, one local reference input connecting spatial reference unit 33, and one reflection light input connecting the input/output separation & optical echo cancelling unit 31. The multi-line generation unit 32 may include a 1×N(N=2, 3, 4, . . . ) optical switch which may consist of one or more 1×2 optical switches. One basic design of the multi-line generation unit 32 may have one Mach-Zehnder interferometer based 1×2 optical switch constructed by one 1×2 splitter 321, one 2×2 coupler 322 and two phase shifters 323, 324. In accordance with these embodiments, the reflections from the interfaces between different components within the system can be mitigated by the echo cancelling process though the reflection power levels could exceed the received power in high-dynamic system. This is because the received reflection signals have much lower frequency components due to its much shorter optical path and can be easily separated by a control circuit proposed as part of the present disclosure.

Figure 3:
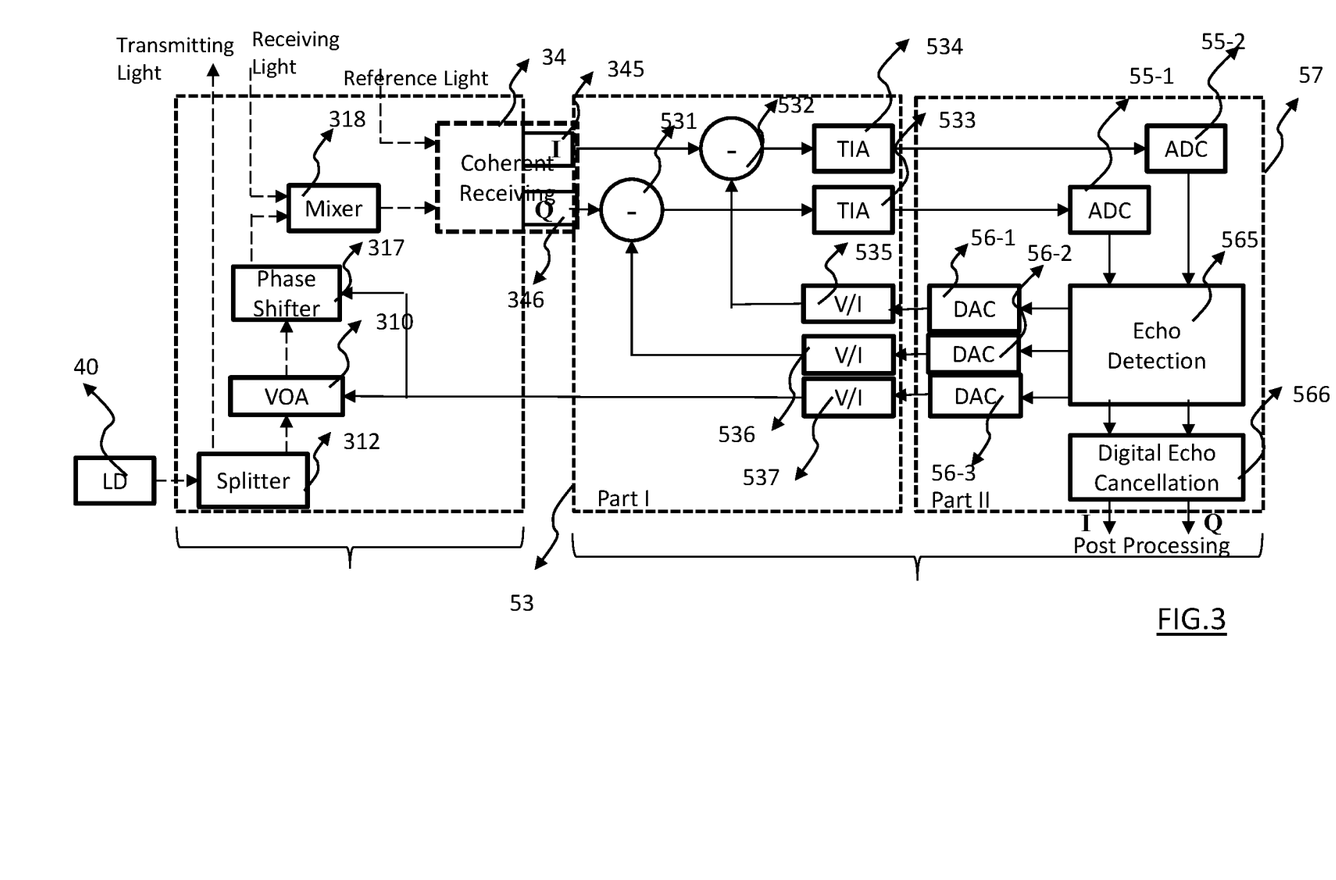
FIG. 3 is a schematic diagram of an echo cancelling circuitry according to some embodiments of the present disclosure.

Echo-cancelling loop is implemented to cancel and mitigate the potential strong reflections generated on interfaces within the LiDAR system according to some embodiments. As shown in FIG. 3, the echo-cancelling loop may include two feedback control loops: an optical echo cancellation loop and an electronic echo cancellation loop. The electronic echo cancelling loop is implemented through both hardware circuitry and digital processing. The first echo cancelling circuit 53 may include two current mode computational circuit 531, 532, TIAs 533, 534, voltage to current converting circuits 535, 536 and 537. The ADC 55 may include ADCs 55-1, 55-2. The DAC 56 may include DACs 56-1, 56-2 and 56-3. First, after I/Q detection in coherent receiving unit 34, currents may be computed in current mode computational circuits 531, 532 arranged between the balanced detector 345, 346 and the TIAs 533, 534. Computed currents may then be amplified and sent to ADCs 55-1 and 55-2. Second, following the ADCs 55-1, 55-2 which are generally integrated in the MCU 50, an echo detection scheme 565 is implemented within the MCU 50 to generate feedback control signals. Two feedback control signals are used to feed current inputs into the current mode computational circuit 531, 532 through DAC 56-1, 56-2 and voltage to current converting circuits 535, 536, forming the electronic echo-cancelling loop to suppress echoes. Since a main echo is generated in optical domain due to LiDAR internal reflections, it could cause strong low-frequency signal fluctuation, where an error signal is extracted by integrating the low frequency signals from DC to certain low frequency value on the balanced detector 345, 346 and is used as part of the echo detection scheme 565 in the optical domain echo cancelling loop. Thus, the third feedback control signal, also generated by the echo detection scheme 565, is sent to adjust the optical VOA 310 and the optical phase shifter 317 through the DAC 56-3 and the voltage to current converting circuits 537. Followed by the echo detection scheme 565, a digital echo cancellation process 566 is implemented to clean up the echoes before any further processing.

Figure 4:
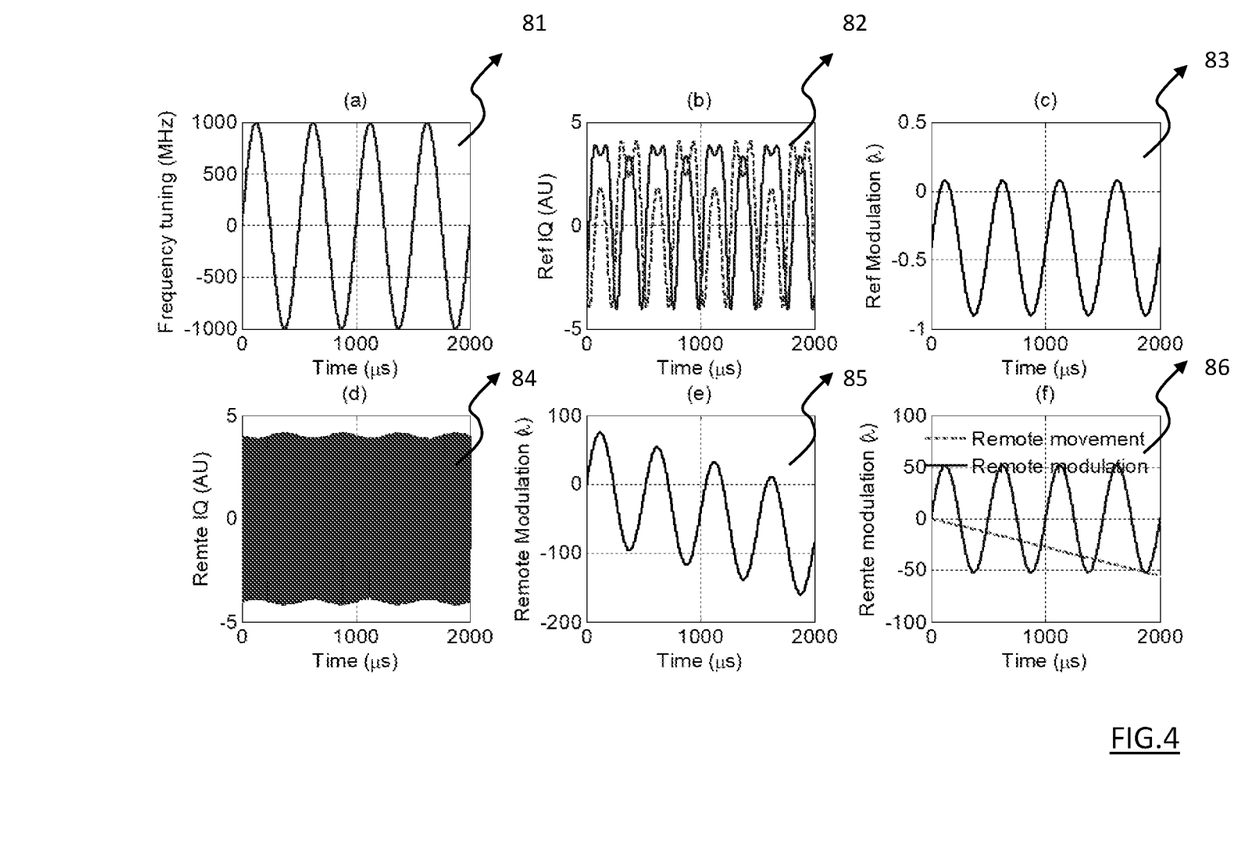
FIG. 4 illustrates the simulation plots of a LiDAR system according to some embodiments of the present disclosure.

Referring to FIG. 4, it illustrates the operational principle of the LiDAR system through phase noise loaded simulations. FIG. 4(a) shows a simulation 81 of the LD 40's frequency change overtime when it's under sinusoidal current modulation with small modulation index. In this simulation, a peak-to-peak 2 GHz frequency modulation is implemented. FIG. 4(b) shows a simulation 82 of the detected I/Q outputs of spatial reference circuit 33 with 10 cm long delay line; and FIG. 4(c) shows a simulation 83 of the calculated phase changes over time at the coherent receiving circuit 34. For the reflected signal from the remote object, the coherent receiving circuit 34 may also generate a stream of I/Q outputs s with much higher oscillating frequency due to the long delay coming with the remote object, see the simulation 84 of FIG. 4(d). By doing the arctan (I/Q) calculation at MCU 50, phase change varies as shown in the simulation 85 of FIG. 4 (e). In FIG. 4(e), the low frequency component represent trending of phase change. Further processing can extract the trending of phase change as well as its peak-to-peak value, see the simulation 86 of FIG. 4 (f). The trending represents the speed of remote object movement. The peak-to-peak value indicates its round trip distance by rationing its phase variation over the consistent phase change created by the built-in 10 cm long delay line. The MCU 50 may be further configured to extract the low frequency component and calculate a relative radial velocity of the remote object based on the low frequency component. The MCU 50 may also be configured to calculate the round trip distance based on the the peak-to-peak value. All these detection and calculation can be conducted within a relative short time slit, for example, 1s.

One of several benefits of some embodiments of the present disclosure is that it doesn't require a linear modulation, which is difficult to implement and prone to distortions. Since the internal-scale calibrates the modulation, any non-ideal shape from the remote object modulation shape can be tolerated.

Another one of several benefits of some embodiments of the present disclosure is that the sampling rate of the receiver can be significantly reduced. The phase detection of the scheme enables the reduction, as phase differentials are continuous in sinusoidal modulation. Any discontinuity resulting from a slower sampling rate can be compensated by an algorithm to remove the missing integrals of multiple 2 πs. At the same sampling rate, the proposed system can have higher frequency modulation rate than linearly modulated FMCW system, and it results in better distance measurement accuracy.

Another one of several benefits of some embodiments of the present disclosure is that relative radial velocity can be calculated in any single detection window as shown in FIG. 4(f). Similar to linear FMCW method, which can distinguish between distance and velocity in a single window, the phases from the coherent receiver map the slope and the amplitude of a sinusoidal shape, to represent the velocity and the distance unambiguously.

Figure 5:
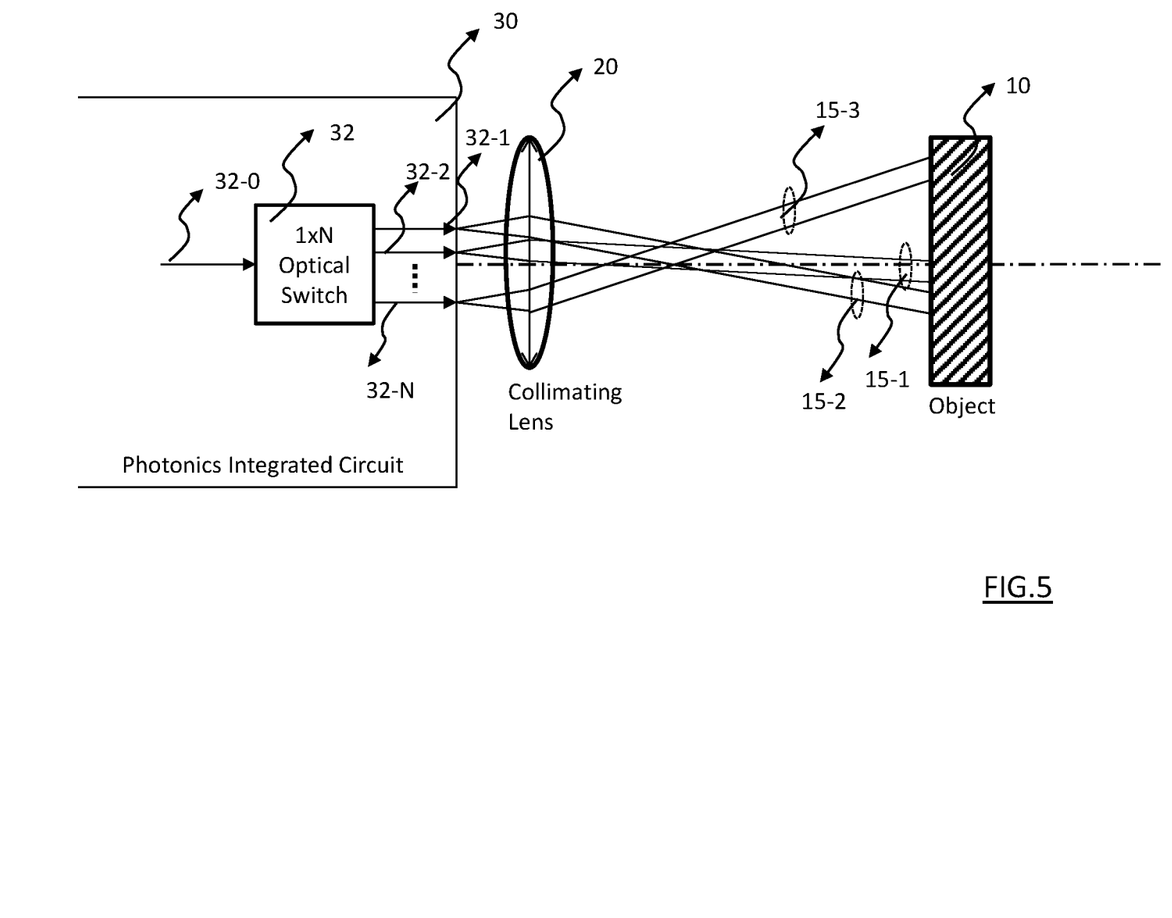
FIG. 5 is a schematic diagram illustrating the implementation of multi-line scanning according to some embodiments of the present disclosure.

Referring to FIG. 5, a multi-line LiDAR method is described using an on-chip 1×N optical switch 32. Assuming the 1×N optical switch 32 has N output ports 32-1, 32-2, . . . , 32-N, all terminated on the PIC 30 edge with a proper designed pitch, i.e. 500 μm, their diverged output light beams can be converted into collimated beams with different emitting/collecting angles through properly selected collimating lens specification. Thus a single PIC LiDAR can be configured into multi-line LiDAR operation with adjustable emitting/collecting angles.

Figure 6:
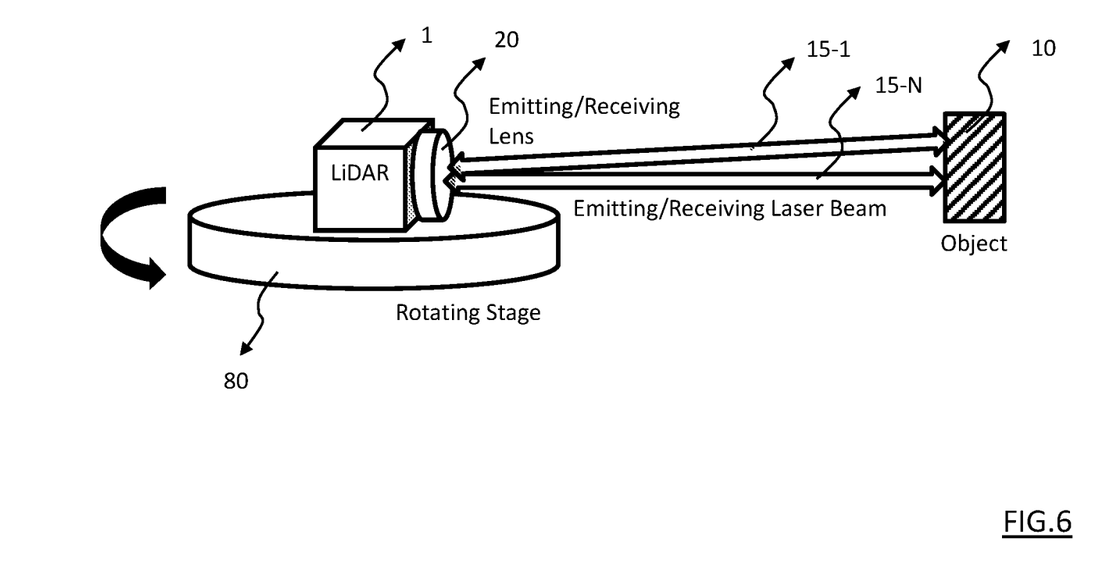
FIG. 6 is a schematic diagram illustrating the wide field of view mechanical implementation according to some embodiments of the present disclosure.

Referring to FIG. 6, it illustrates the principle how the LiDAR system according to some embodiments could be used for a wide field of view mechanical implementation. With small size/weight and fast detection capability, the LiDAR 1 can be mounted on a fast rotating stage 80 to achieve up to 360 degree wide field of view perpendicular to the rotating axis.

It should be noted that the above description about the Lidar system is merely an example, should not be understood as the only embodiment. To those skilled in the art, after understanding the basic principles of the connection between different units, the units and connection between the units may be modified or varied without departing from the principles. The modifications and variations are still within the scope of the current disclosure described above. In some embodiments, these units may be independent, and in some embodiments, part of the units may be integrated into one unit to work together.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. For example, it shall be appreciated to those skilled in the art.

The various embodiments and/or components, for example, the modules, units, processors, components and controllers, may be implemented as part of one or more processors. The processor may include a microprocessor. The microprocessor may be connected to a communication bus. The processor may also include a memory. The memory may include Random Access Memory (RAM) and Read Only Memory (ROM). The processor executes a set of instructions that are stored in one or more storage elements, in order to process input data. The storage elements may also store data or other information as desired or needed. The storage element may be in the form of an information source or a physical memory element within a processing machine.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, may be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) may be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein may be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Some embodiments of this application are described herein. Variations on those embodiments will become apparent to those of ordinary skill in the art upon reading the foregoing description. It is contemplated that skilled artisans may employ such variations as appropriate, and the application may be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A Light Detection and Ranging (LiDAR) system comprising,
    a light source configured to emit light with a frequency modulated in narrow-band time sequence;
    an optical transmitter waveguide configured to guide the emitted light toward a remote object;
    an optical receiver waveguide configured to receive reflection light from the remote object;
    a reference delay interferometer configured to interfere reference light with a delay of the reference light and produce a first in-phase output and a first quadrature output;
    a coherent receiver configured to mix the emitted light with the reflection light and produce [an]a second in-phase output and a second quadrature output; and
    a processor configured to calculate a first phase variance related to the modulated frequency based on the first in-phase output, the first quadrature output, and a second phase variance related to the modulated frequency based on second in-phase output and the second quadrature output,
    wherein the reference light is derived from the emitted light.

2. The LiDAR system according to claim 1, wherein the optical transmitter waveguide and the optical receiver waveguide are integrated in a duplex waveguide.

3. The LiDAR system according to claim 1, further comprising optical lens arranged after the optical transmitter waveguide and the optical receiver waveguide.

4. The LiDAR system according to claim 1, wherein the processor is further configured to derive a ratio between the first phase variance and the second phase variance and calculate the absolute distance of the remote object.

5. The LiDAR system according to claim 1, wherein the second in-phase output and second quadrature output comprise a low frequency component representing the trending of phase change, the processor is configured to extract [a]the low frequency component of the second in-phase output and second quadrature output, and calculate a relative radial velocity of the remote object based on the low frequency component.

6. The LiDAR system according to claim 1, further comprising a multiple line generation circuit configured to duplicate the output of the transmitter waveguide and/or the input of the receiver waveguide into multiple lines.

7. The LiDAR system according to claim 6, further comprising multiple optical switches each corresponding to each of the multiple lines.

8. The LiDAR system according to claim 6, further comprising a mechanical system configured to rotate and delivers the emitted light towards different orientations.

9. The LiDAR system according to claim 6, further comprising an echo cancelling electrical circuit configured to mitigate unintended reflection from components within the system.

10. The LiDAR system according to claim 9 wherein the echo cancelling electrical circuit comprising, an echo detector coupled to the coherent receiver; and
   a loopback control path configured to calculate an add-on current and apply the add-on current to a current received from the second in-phase output and the second quadrature output of the coherent receiver.

11. The LiDAR system according to claim 6, further comprising an echo cancelling optical circuit, configured to mitigate unintended reflection from components within the system.

12. The LiDAR system according to claim 11, wherein the echo cancelling optical circuit comprising:
   an echo detector coupled to the coherent receiver;
   a variable optical attenuator coupled to the optical transmitter waveguide and the optical receiver waveguide;
   a phase adjustor coupled to the optical attenuator; and
   a loopback control path configured to calculate an attenuation of the variable optical attenuator and a phase value of the phase adjustor so as to match the unintended reflection applied to the coherent receiver.

13. A light detection and ranging method comprising:
   emiting light with a frequency modulated in narrow-band time sequence;
   guiding the emitted light toward a remote object;
   receiving reflection light from the remote object;
   interfering reference light with a delay of the reference light and produce a first in-phase output and a first quadrature output;
   mixing the emitted light with the reflection light and produce [an]a second in-phase output and a second quadrature output; and
   calculating a first phase variance related to the modulated frequency based on the first in-phase output and the first quadrature output, and a second phase variance related to the modulated frequency based on second in-phase output and the second quadrature output;
   wherein the reference light is derived from the emitted light.

14. The method according to claim 13, further comprising deriving a ratio between the first phase variance and the second phase variance and calculate the distance of the remote object.

15. The method according to claim 14, wherein the second in-phase output and second quadrature output comprise a low frequency component representing the trending of phase change, and the method further comprising extracting a low frequency component of the second in-phase output and second quadrature output, and calculating a relative radial velocity of the remote object based on the low frequency component.

* * * * *